United States Patent
Kwon et al.

(10) Patent No.: US 12,475,053 B2
(45) Date of Patent: Nov. 18, 2025

(54) METHOD FOR DETECTING ERROR OF OPERATING SYSTEM KERNEL MEMORY IN REAL TIME

(71) Applicant: UIF (UNIVERSITY INDUSTRY FOUNDATION), YONSEI UNIVERSITY, Seoul (KR)

(72) Inventors: Taekyoung Kwon, Seoul (KR); Min Gi Cho, Seoul (KR); Do Hyeon An, Daegu (KR); Gi Su Yeo, Busan (KR)

(73) Assignee: UIF (UNIVERSITY INDUSTRY FOUNDATION), YONSEI UNIVERSITY, Seoul (KR)

( * ) Notice: Subject to any disclaimer, the term of this patent is extended or adjusted under 35 U.S.C. 154(b) by 222 days.

(21) Appl. No.: 18/256,702

(22) PCT Filed: Dec. 6, 2021

(86) PCT No.: PCT/KR2021/018312
§ 371 (c)(1),
(2) Date: Jun. 9, 2023

(87) PCT Pub. No.: WO2022/124720
PCT Pub. Date: Jun. 16, 2022

(65) Prior Publication Data
US 2024/0095174 A1 Mar. 21, 2024

(30) Foreign Application Priority Data
Dec. 9, 2020 (KR) .................. 10-2020-0171585

(51) Int. Cl.
G06F 12/08 (2016.01)
G06F 12/0871 (2016.01)
G06F 12/0882 (2016.01)

(52) U.S. Cl.
CPC ...... G06F 12/0871 (2013.01); G06F 12/0882 (2013.01)

(58) Field of Classification Search
CPC .................. G06F 12/0871; G06F 12/0882
See application file for complete search history.

(56) References Cited

U.S. PATENT DOCUMENTS

2009/0013145 A1* 1/2009 Chittigala ............. G06F 9/5016
711/170
2010/0146127 A1* 6/2010 Schmieder ............. G06F 9/545
709/228

FOREIGN PATENT DOCUMENTS

| JP | 2014-67214 A | 4/2014 |
| KR | 10-2012-0043377 A | 5/2012 |
| KR | 10-2013-0131026 A | 12/2013 |
| KR | 10-2044075 B1 | 11/2019 |

(Continued)

OTHER PUBLICATIONS

International Search Report for PCT/KR2021/018312 by Korean Intellectual Property Office dated Mar. 3, 2022.

*Primary Examiner* — Kenneth M Lo
*Assistant Examiner* — Han V Doan
(74) *Attorney, Agent, or Firm* — BROADVIEW IP LAW, PC

(57) ABSTRACT

The present embodiments provide a method and an apparatus for detecting an error of a kernel memory in real time, wherein the method and the apparatus select only an object process in real time without a source code and check a memory error of an operating system kernel only for the object process, thereby minimizing an impact on kernel performance.

6 Claims, 8 Drawing Sheets

(56) References Cited

FOREIGN PATENT DOCUMENTS

KR 10-2019-0135337 A 12/2019
KR 10-2254159 B1 5/2021

* cited by examiner

METHOD FOR DETECTING ERROR OF OPERATING SYSTEM KERNEL MEMORY IN REAL TIME

TECHNICAL FIELD

A technical field of the present invention relates to a method for detecting an error of an operating system kernel memory in real time. This study is related to a project (No. 2018-0-00513, Study on UNIX based kernel vulnerability detection automation by utilizing machine learning) conducted with the support of the Information and Communications Technology Evaluation and Planning with funding from the government (Ministry of Science and ICT) in 2021.

BACKGROUND ART

The contents described in this section merely provide background information on the present exemplary embodiment but do not constitute the related art.

Fuzzing and Concolic execution are widely used to find bugs in software. When a new test input is generated using fuzzing and concolic execution and a program is executed using the generated test input, if the program causes an abnormal operation, it is determined that there is a bug in the software. At this time, the abnormal operation of the program means that the program is forcibly terminated. Such a dynamic test method requires the detection of the abnormal operation of the program to find the bug so that there is a problem in that a bug which does not cause the abnormal operation of the program cannot be found.

In order to solve the proposed problem, in order to find a memory error bug in which the program is not forcibly terminated, various memory error detection methods have been proposed. Google has released Address Sanitizer to detect memory errors such as buffer overflows.

The address sanitizer detects a memory error from one process which is executed in a user area. In order to detect the memory error, a function related to memory allocation and deallocation is changed when the user program is compiled. The changed memory allocation function generates a red zone before and after a memory to be allocated when the memory is allocated and generates a shadow memory zone for a memory address area.

The shadow memory stores information about whether accessible to the memory. Thereafter, when the memory read/write instruction is executed, after checking a shadow memory value for a memory address to which the access occurs, if the address is accessible, the program is normally executed and if the address is not accessible, after outputting an error message, the program is terminated.

The address sanitizer is applied only to software having a source code, but cannot be applied to an operating system whose source code is not open.
(Patent Document 1) Korean Registered Patent Publication No. 10-2044075 (Nov. 6, 2019)

DISCLOSURE

Technical Problem

A main object of exemplary embodiments of the present invention is to minimize an impact on kernel performance by selecting only an object process in real time without a source code and checking a memory error of an operating system kernel only for the object process.

Other and further objects of the present disclosure which are not specifically described can be further considered within the scope easily deduced from the following detailed description and the effect.

Technical Solution

According to an aspect of the present embodiment, an error detecting method of a kernel memory in real time includes: registering a management object process; allocating a memory area to a memory address space of the kernel with respect to the management object process; detecting a memory error for the memory area using an interrupt handler of the kernel; and deallocating the memory area.

In a situation in which a plurality of processes is simultaneously executed, a plurality of processes shares a memory address space of a kernel.

The allocating of a memory area includes allocating a normal memory area to a memory address space of a kernel if the process requested to be executed does not correspond to the management object process; and allocating a detection object memory area to a memory address space of a kernel if the process requested to be executed corresponds to the management object process.

The allocating of a memory area includes setting a red zone in the detection object memory area and allocating a shadow memory area for the detection object memory area to the memory address space of the kernel.

The allocating of a memory area includes changing a page access permission to a virtual address of the memory address space of the kernel, and the detecting of a memory error includes determining whether a virtual address which tries the access is the detection object memory area or the normal memory area by means of a memory error test by an interrupt handler of the kernel.

In the detecting of a memory error, if the virtual address corresponds to the detection object memory area, the shadow memory area is tested to check a memory error and if it is an error, error information having a first detailed error type flag is output.

If the virtual address corresponds to the detection object memory area, the shadow memory area is tested to check the memory error, and if it does not correspond to the error, after changing a page access permission to the virtual address to be allowable, a single instruction is performed, and then a page accessible permission to the virtual address is set to be inaccessible.

When the virtual address corresponds to the normal memory area, the interrupt is processed by the kernel.

In the deallocating, when a memory deallocation request for the process is received, it is determined whether to correspond to the management object process, if it corresponds to the management object process, a shadow memory area for the detection object memory area corresponding to the memory deallocation request is allocated to the memory address space of the kernel and the detection object memory area corresponding to the memory deallocation request is deallocated.

In the detecting of a memory error, if it is in a situation in which an access is tried to the virtual address of the shadow memory area for the detection object memory area corresponding to the memory deallocation request, error information having a second detailed error type flag is output.

According to another aspect of the present embodiment, an error detection apparatus of a kernel memory, comprising: a management object registration module which registers a management object process; a memory allocating module which allocates a memory area to a memory address space of the kernel with respect to the management object process; a memory error detection module which detects a memory error for the memory area using an interrupt handler of the kernel; and a memory deallocation module which deallocates the memory area.

Advantageous Effects

As described above, according to the exemplary embodiments of the present invention, only an object process is selected in real time without a source code and a memory error of the operating system kernel is checked only for the object process to minimize the impact on the kernel performance.

Even if the effects are not explicitly mentioned here, the effects described in the following specification which are expected by the technical features of the present disclosure and their potential effects are handled as described in the specification of the present disclosure.

MODE FOR CARRYING OUT THE DISCLOSURE

Figure 1:
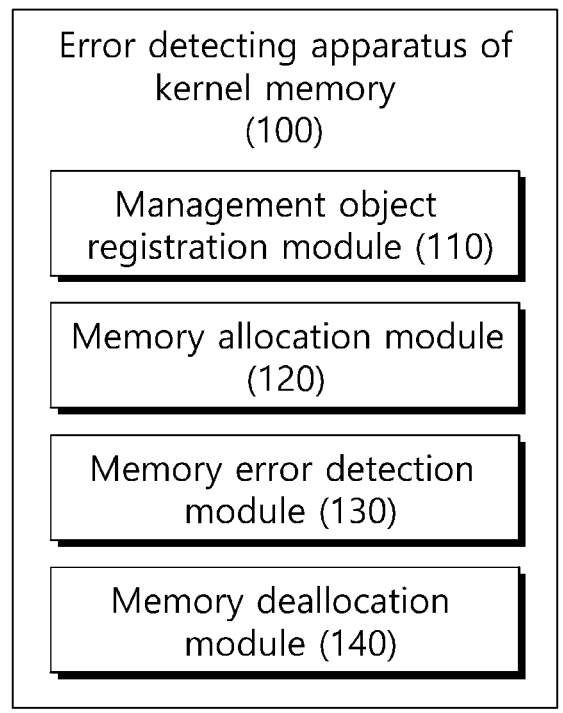
FIG. 1 is a block diagram illustrating an error detecting apparatus of a kernel memory according to an exemplary embodiment of the present invention.

Hereinafter, in the description of the present disclosure, a detailed description of the related known functions will be omitted if it is determined that the gist of the present disclosure may be unnecessarily blurred as it is obvious to those skilled in the art and some exemplary embodiments of the present disclosure will be described in detail with reference to exemplary drawings.

According to the error detecting technique of the related art, a memory test code is added during a compile process so that a source code of a bug finding object is necessary. A source code of the operating system is not open to the public so that it is difficult to apply a source code by means of the compile if a user is not an internal developer.

According to the exemplary embodiment, a source code is not necessary to check the memory error so that the exemplary embodiment is applicable to the operating system. Even though the source code of the operating system is open to the public, it is applicable to a software test which is provided by the other party, such as a device driver whose source code is not provided.

In the operating system kernel, a plurality of processes is simultaneously executed so that if the memory error detection technique of the related art is applied, the performance is greatly degraded. The kernel simultaneously performs a plurality of functions, such as process management, memory management, or device management and at this time, all the functions are not used for the test at one time. Accordingly, if the entire kernel process is included as a test object without being limited to the test object process, a very large loss is caused in terms of the speed, as well as the waste of address space.

The kernel is involved in all tasks performed on the operating system so that it causes not only time-critical issues, but also overall delay in all the other tasks, unlike the user process. Such delay requires more time to detect a memory error with an error detection tool, such as a fuzzer. That is, according to the related art, the memory error test is performed on the entire kernel so that a memory error test is performed on a function which is not a test object, which directly impacts the performance.

According to the exemplary embodiment, the memory error test is not performed on all the processes of the kernel, but is selectively performed on a specific process, to minimize the degradation of the performance of the kernel.

According to the exemplary embodiment, memory error detection is selectively performed only on a test object kernel function or module from which a user wants to find a bug, among bugs in which an abnormal operation of the software is generated, so that a bug in which an abnormal operation of the software is not generated, among bugs in the operating system kernel, is found. Types of bugs which can be found include heap buffer overflow, use-after-free, and out-of-bounds read/write. The bug can be classified using a detailed error type flag of error information to be output.

FIG. 1 is a block diagram illustrating an error detecting apparatus of a kernel memory according to an exemplary embodiment of the present disclosure.

The error detecting apparatus 100 of a kernel memory manages a dynamic memory used in the operating system kernel. The error detecting apparatus 100 of a kernel memory includes a management object registration module 110 which registers a management object process, a memory allocation module 120 which allocates a memory area to a memory address space of the kernel with respect to the management object process, a memory error detection module 130 which detects a memory error for a memory area using an interrupt handler of a kernel, and a memory deallocation module 140 which deallocates the memory area.

The management object registration module 110 determines which process (an execution file) can be a memory test object.

The memory allocation module 120 performs an additional task for memory error detection when the memory is allocated during the memory allocating step. At this time, when the memory is allocated, in order to perform an additional task, hooking or inline patch may be used for the kernel memory allocation functions.

The memory error detection module 130 checks whether a memory error is generated when the memory area is used.

The memory deallocation module 140 organizes additional resources used for the memory detection. At this time, a method such as hooking or inline patch may be used for the kernel memory deallocating functions.

Figure 2:
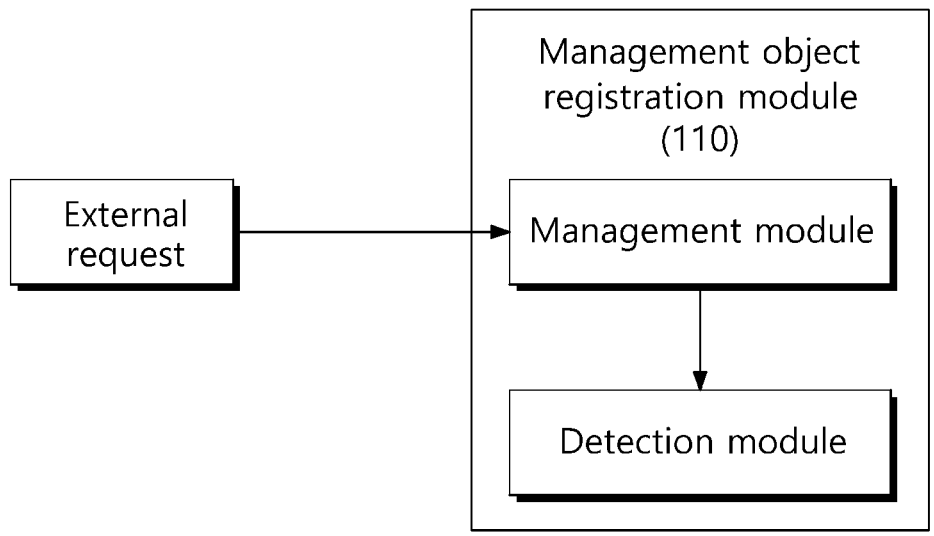
FIG. 2 is a view illustrating a management object registration module of an error detecting apparatus of a kernel memory according to an exemplary embodiment of the present invention.

FIG. 2 is a view illustrating a management object registration module of an error detecting apparatus of a kernel memory according to an exemplary embodiment of the present invention.

In the management target registration module 110, the management module receives an object to designate a memory error test through an external request (fuzzer, kernel module developer, etc.). At this time, the request may be an already running kernel process or a kernel module with an execution file format. Thereafter, the memory management object registration is completed by registering identifiable information between processes, such as pid, in the detecting apparatus.

Figure 3:
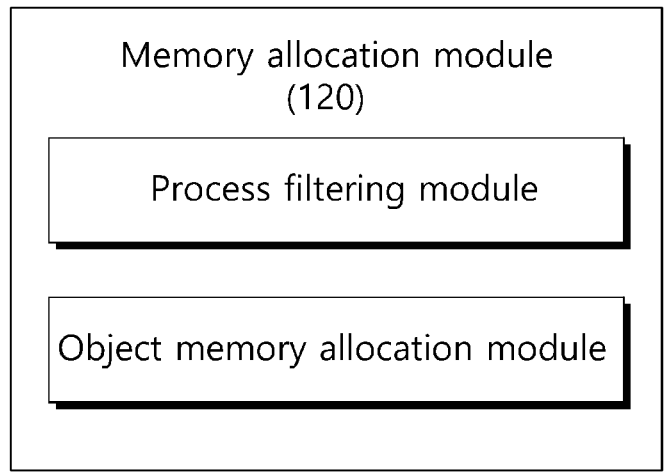
FIGS. 3 and 4 are views illustrating a memory allocation module of an error detecting apparatus of a kernel memory according to an exemplary embodiment of the present invention.
Figure 4:
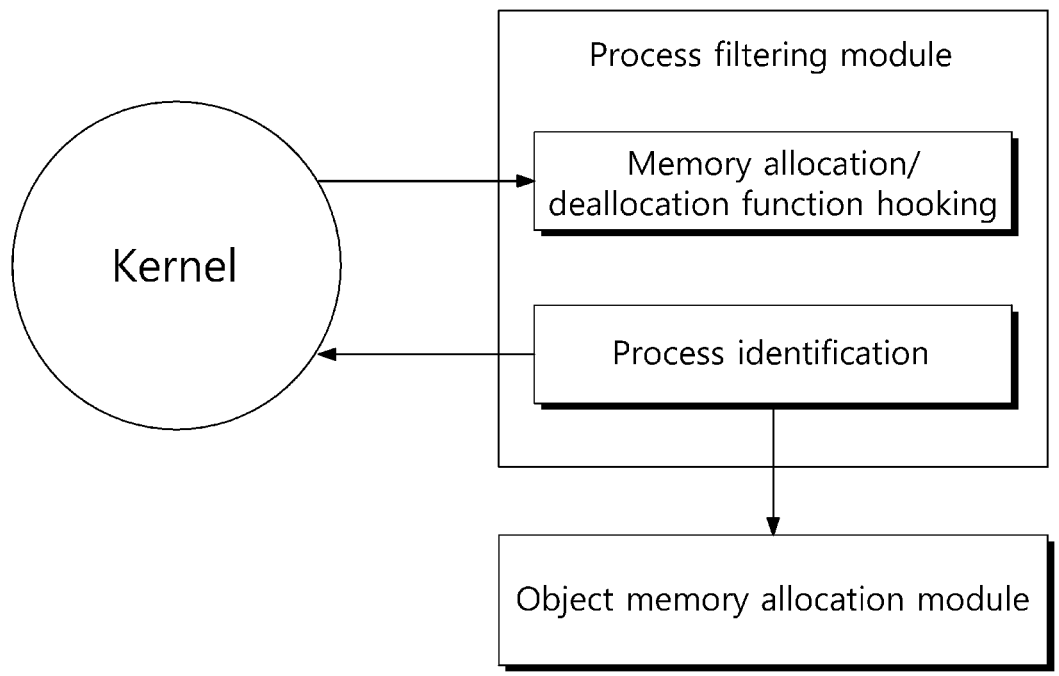

FIGS. 3 and 4 are views illustrating a memory allocation module of an error detecting apparatus of a kernel memory according to an exemplary embodiment of the present invention.

When the kernel requests the memory allocation, the memory allocation module 120 checks whether the request is a request of a process registered in a management object. If the request is a request of the registered process, when a memory allocation function is called, a function according to an algorithm defined according to the present exemplary embodiment is called before and after executing the memory allocation function. By doing this, the memory error test is selectively performed to enable more effect memory error detection.

When a memory allocation related function is called from the kernel, a process filtering module identifies whether the corresponding memory area is an area of a process to be tested by inline hooking. If it is confirmed to be a test object process, a requested allocation size is transmitted to the object memory allocation module and if not, normal memory allocation is performed.

Figure 5:
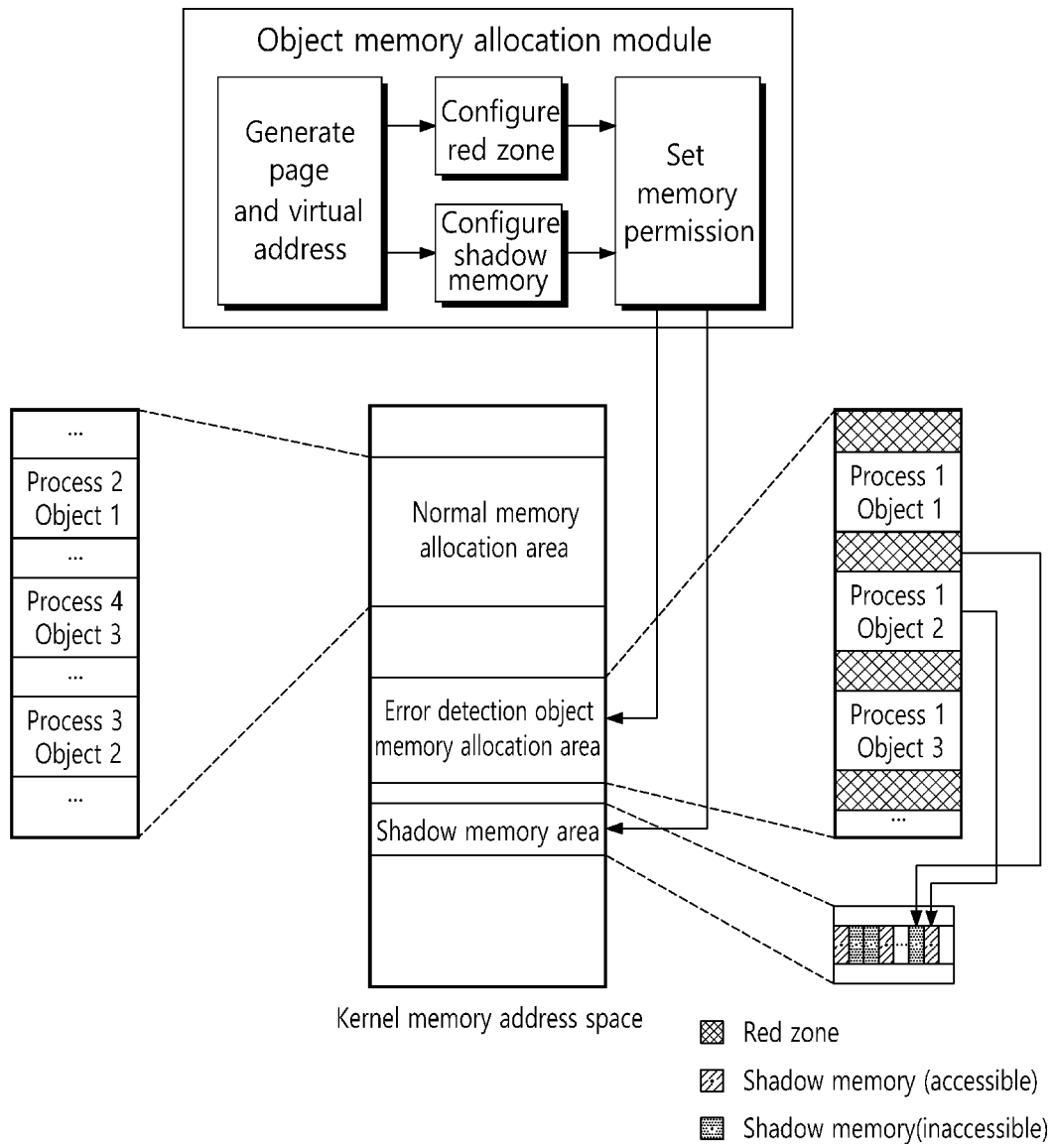
FIG. 5 is a view illustrating a memory area which is processed by an error detecting apparatus of a kernel memory according to an exemplary embodiment of the present invention.

FIG. 5 is a view illustrating a memory area which is processed by an error detecting apparatus of a kernel memory according to an exemplary embodiment of the present invention.

As a process filtering result, if the corresponding process is a test process, after executing the memory allocation function, an additional operation for detecting a memory error is performed. First, a memory which is larger than a size of the memory requested to perform the memory allocation is allocated to an area separated from the existing memory area.

Looking at a kernel memory area and a process of a memory generation module to allocate a memory to the corresponding area, a kernel address sanitizer performs all the memory allocation in a general memory allocation area without distinguishing an allocation area. In contrast, in the exemplary embodiment, a memory area of an error detection object which is used by a detection object process is distinguished.

In FIG. 5, it is confirmed that the error detection object memory area is allocated to an area which is distinguished from a memory which is generally allocated. By this task, the memory error detection is performed only for an object belonging to the test object process. A red zone is generated only for an object allocated by a detection object process.

In order to efficiently check the red zone, the shadow memory is generated only for the memory allocation area of the error detection object and records the accessibility to the corresponding area memory, unlike the existing method.

Finally, a permission of the allocated memory is changed after generating the red zone and the shadow memory. The permission of the memory is changed to inaccessible so that when the access to the memory is detected, interrupt is generated to detect a memory error.

Figure 6:
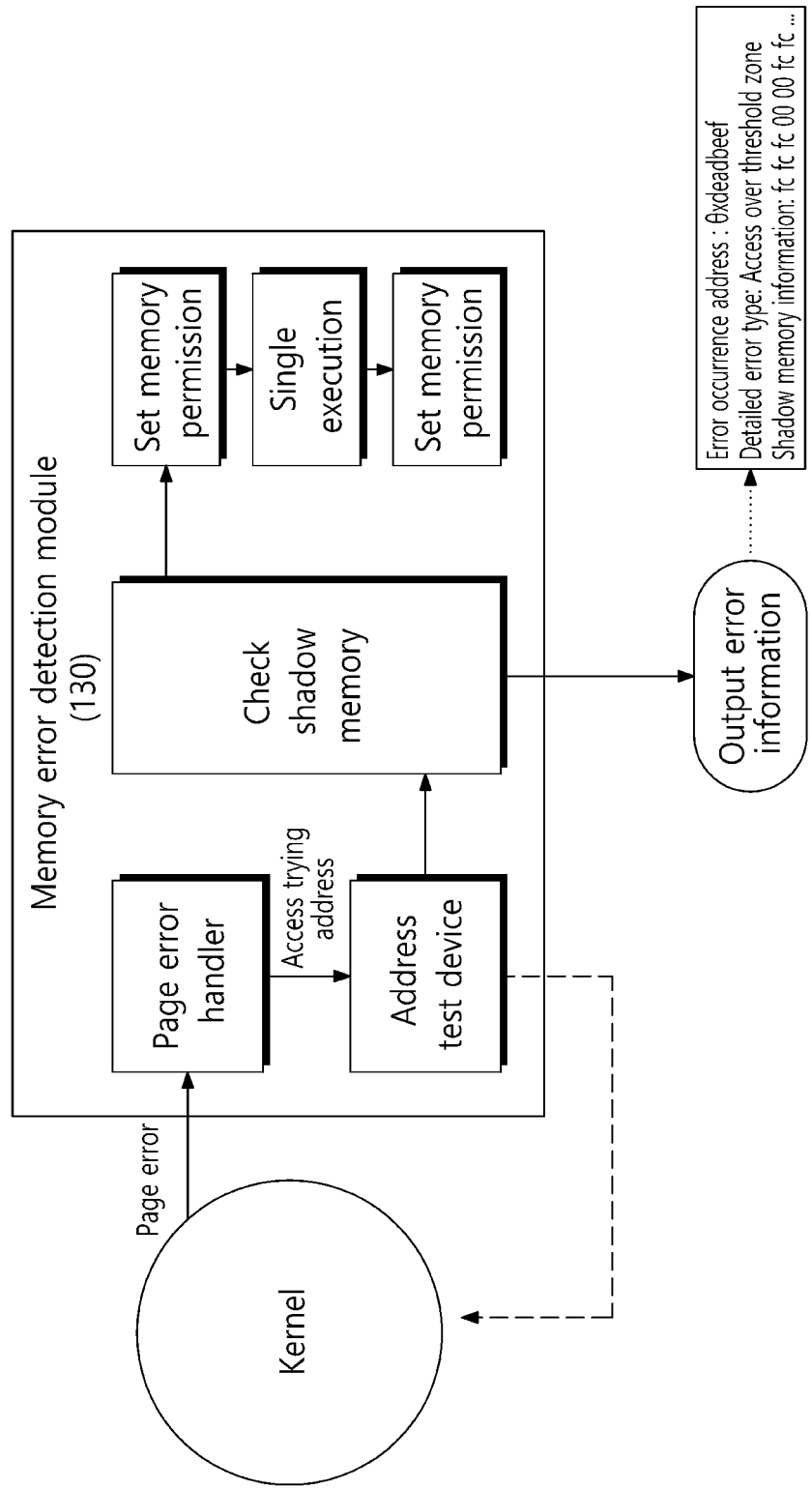
FIG. 6 is a view illustrating a memory error detection module of an error detecting apparatus of a kernel memory according to an exemplary embodiment of the present invention.

FIG. 6 is a view illustrating a memory error detection module of an error detecting apparatus of a kernel memory according to an exemplary embodiment of the present invention.

An object memory allocation module deletes an access permission to the memory area from which a memory error is to be detected so that when the process tries to access the memory, such as read or write, a page access denial interrupt is generated.

When the interrupt is generated, a page error handler transmits corresponding memory error information to an address test device. The information transmitted at this time is an address of a memory which is tried to be accessed and the address test device identifies whether it is an interrupt generated in the management object memory using the information.

If the interrupt is generated from the management object memory, a shadow memory for the address is checked to identify whether a memory error occurs and if an error occurs, error information is output. At this time, the error information includes an error occurred address, a detailed error type, and shadow memory information.

If it is not an interrupt generated in the management object memory, an original page access denial error handler of the kernel is called and then the subsequent process is assigned to the kernel.

After completing a shadow memory checking process, a page becomes temporarily accessible and then an instruction is executed by single execution. Therefore, the page is set to be inaccessible and then the process ends. By doing this, the memory error detection can be performed on the repeated access to the virtual address.

Figure 7:
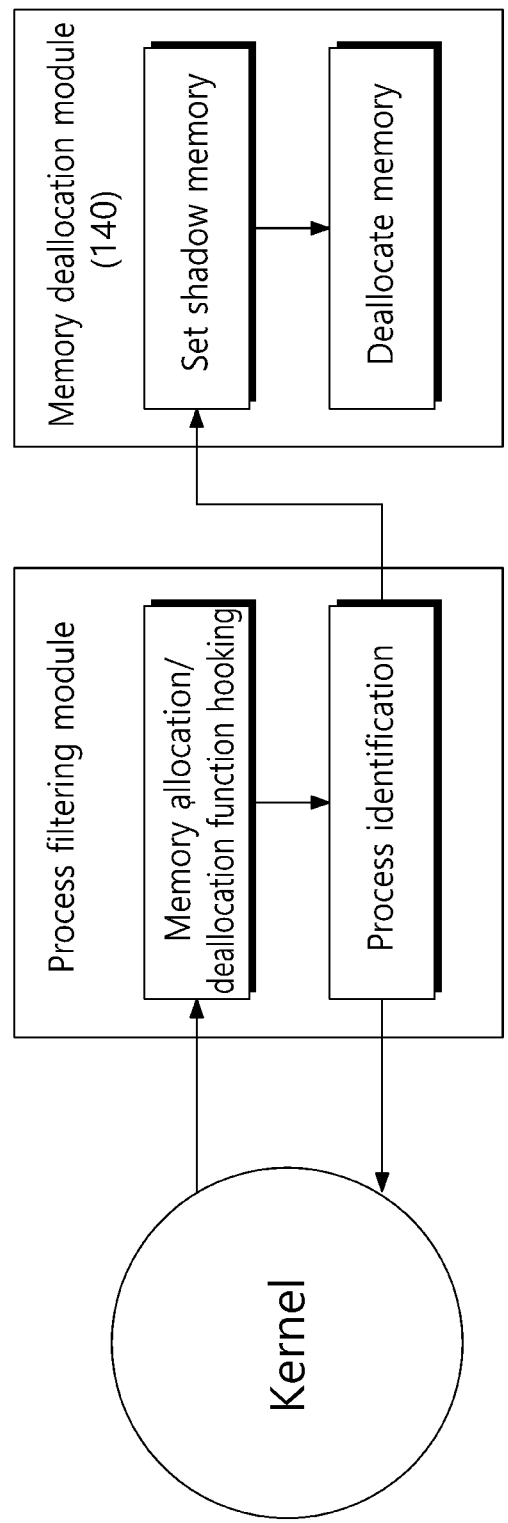
FIG. 7 is a view illustrating a memory deallocation module of an error detecting apparatus of a kernel memory according to an exemplary embodiment of the present invention.

FIG. 7 is a view illustrating a memory deallocation module of an error detecting apparatus of a kernel memory according to an exemplary embodiment of the present invention.

After using the memory, when the memory deallocation is requested to the management object registration module 110, it is filtered whether it is a test object process. After filtering, if it is the test object process, the memory allocation has been performed for memory error detection so that the memory deallocation module for performing this is subjected to a shadow memory setting and a request memory deallocation process and if it is not the test object process, normal memory deallocation is performed.

Figure 8:
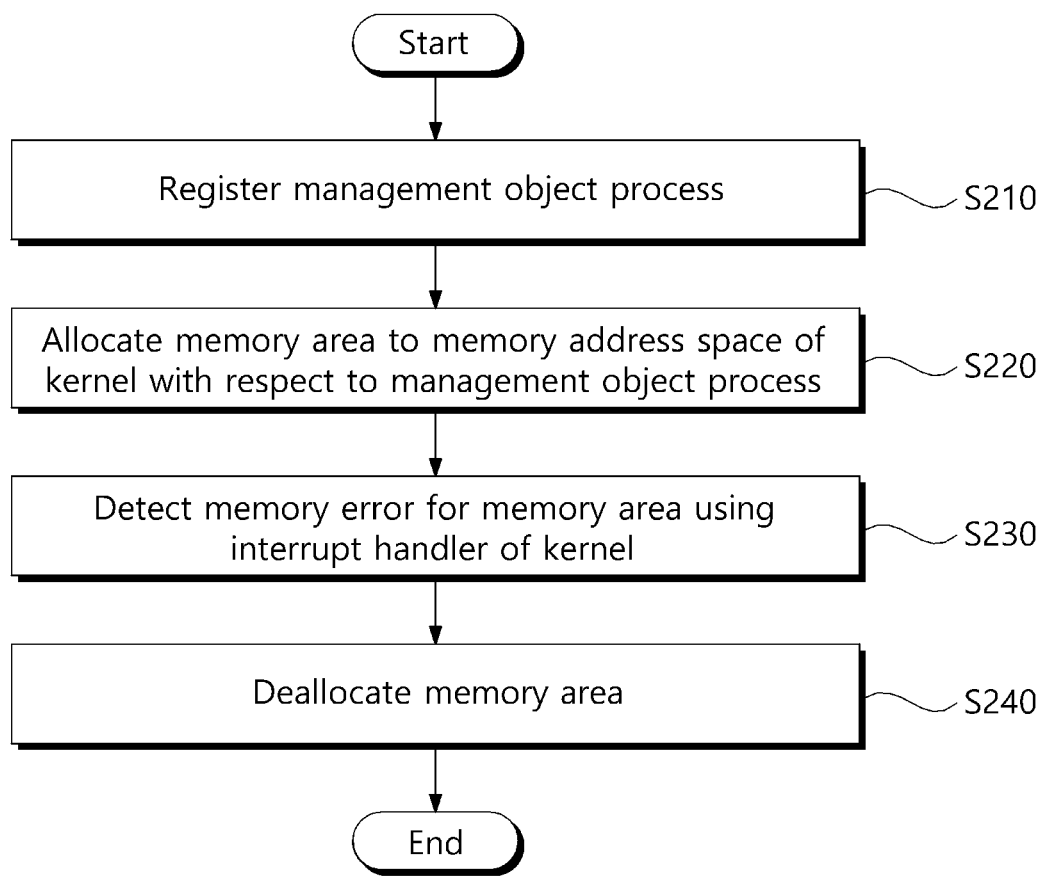
FIGS. 8 to 10 are flowcharts illustrating an error detecting method of a kernel memory in real time according to another exemplary embodiment of the present disclosure.
Figure 9:
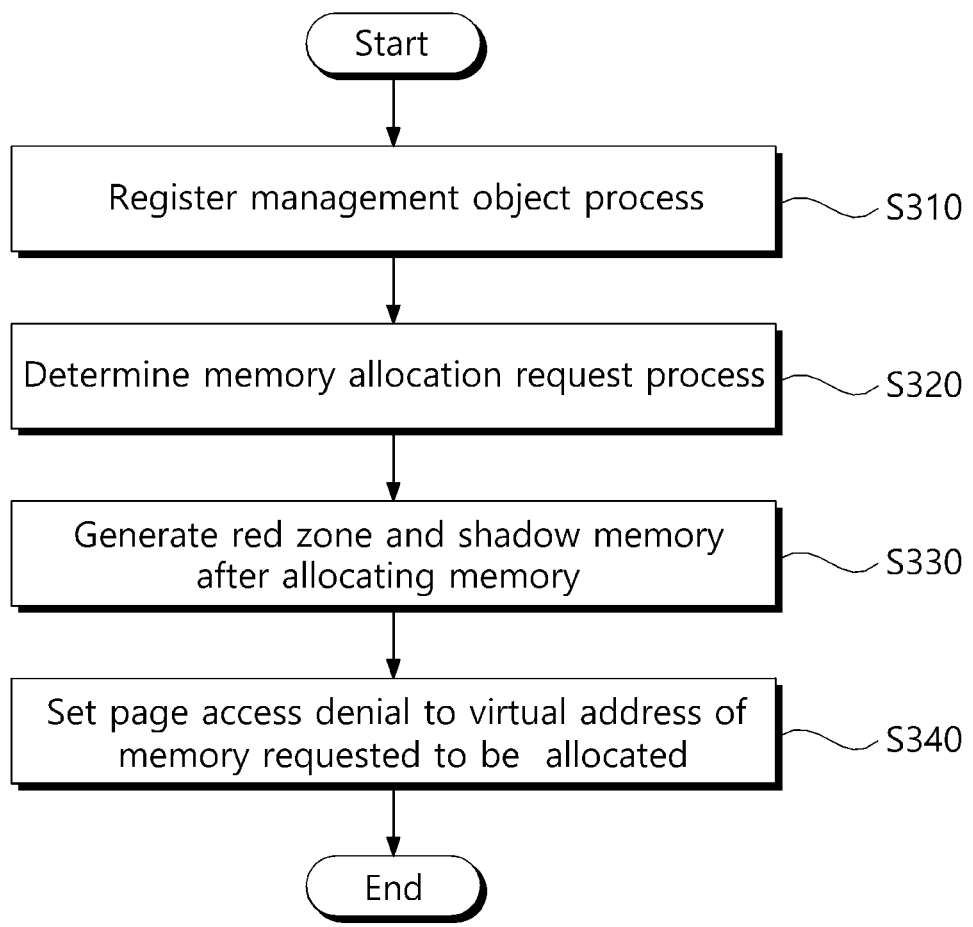
Figure 10:
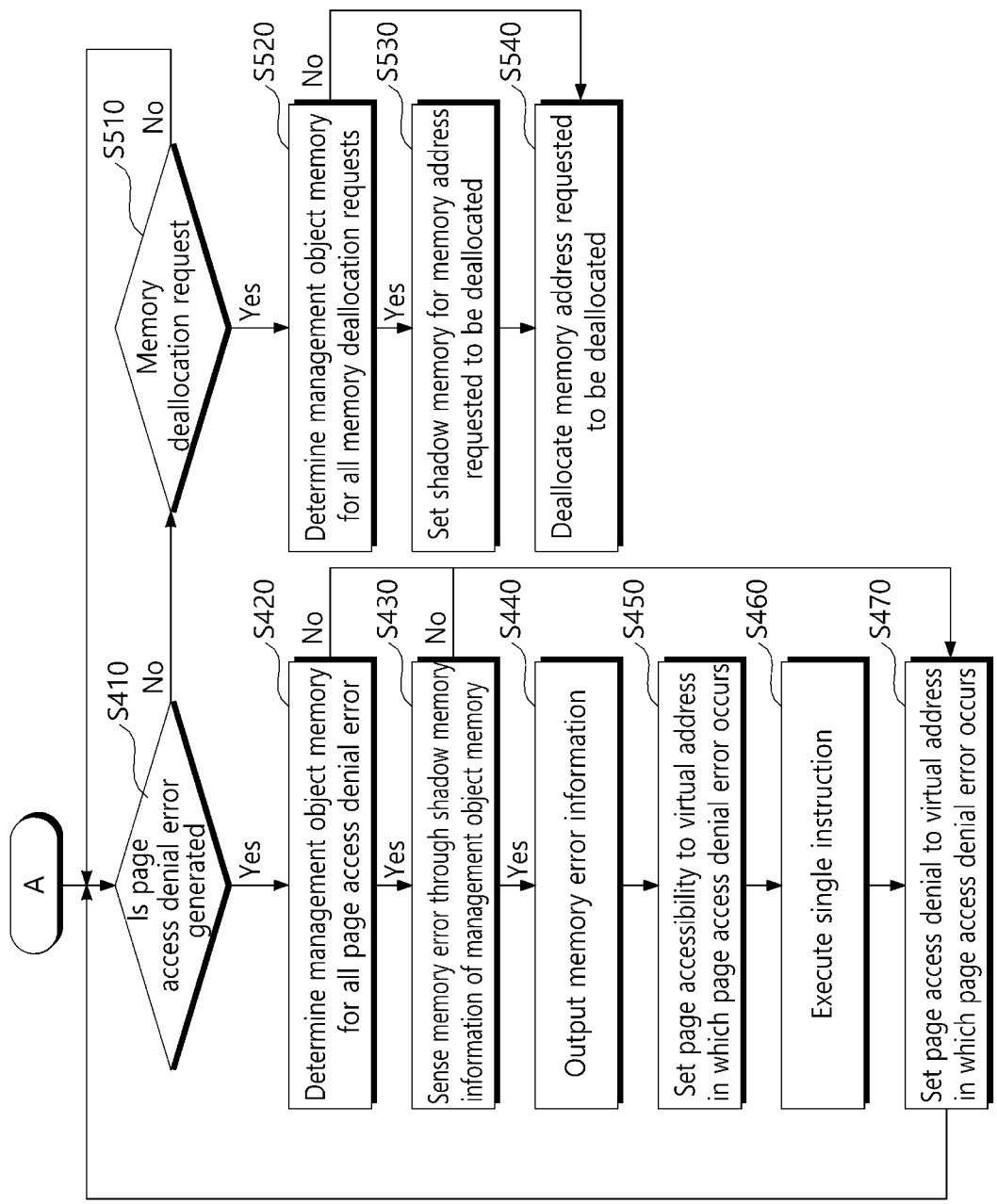

FIGS. 8 to 10 are flowcharts illustrating an error detecting method of a kernel memory in real time according to another exemplary embodiment of the present disclosure. An error detecting method of a kernel memory in real time is performed by the error detection apparatus of a kernel memory.

Referring to FIG. 8, in step S210, a management object process is registered. In step S220, a memory area is allocated to a memory address space of a kernel with respect to the management object process. In step S230, a memory error is detected from the memory area using an interrupt handler of the kernel. In step S240, the allocation for the memory area is deallocated.

Referring to FIG. 9, in step S310, a management object process is registered. In a situation in which a plurality of processes is simultaneously executed, a plurality of processes shares a memory address space of a kernel.

In step S320, a memory allocation request process is determined. The step of allocating a memory area includes a step of allocating a memory to a normal memory area of a memory address space of a kernel if the process requested to be executed does not correspond to the management object process and a step of allocating a memory to a detection object memory area of a memory address space of a kernel if the process requested to be executed corresponds to the management object process.

In step S330, a red zone and a shadow memory are generated. The step of allocating a memory area includes a step of setting a red zone in the detection object memory area and a step of allocating a shadow memory area for the detection object memory area to a memory address space of the kernel.

In step S340, page access denial for a virtual address of the memory requested to be allocated is set. The step of allocating a memory area includes a step of changing a page access permission to a virtual address of a memory address space of the kernel.

The step of detecting a memory error includes a step of determining whether a virtual address tried to be accessed is the detection object memory area or a normal memory area by means of a memory error test by an interrupt handler of the kernel.

Referring to FIG. 10, in step S410, it is determined whether a page access denial error is generated. In step S420, a management object memory for all page access denial errors is determined. In step S430, a memory error is detected by means of shadow memory information of the management object memory. In step S440, memory error information is output.

In the step of detecting a memory error, if the virtual address corresponds to the detection object memory area, the shadow memory area is tested to check a memory error and if it is an error, error information having a first detailed error type flag (exceeds threshold zone) is output.

In step S450, a page accessible function to a virtual address in which page access denial error is generated is set. In step S460, a single instruction is executed. In step S470, a page access denial is set to a virtual address in which page access denial error is generated.

If the virtual address corresponds to a detection object memory area, the shadow memory area is tested to check the memory error, and if it does not correspond to the error, a page access permission to the virtual address is set to be allowable, a single instruction is executed, and then a page access permission to the virtual address is set to be inaccessible.

If the virtual address corresponds to the general memory area, interrupt is processed by the kernel.

In step S510, a memory deallocation request is determined. In step S520, a management object memory for all the memory deallocation requests is determined. In step S530, a shadow memory for a memory address requested to be deallocated is set. In step S540, a memory for a memory address requested to be deallocated is deallocated.

In the step of deallocating, if the memory deallocation request for the process is received, it is determined whether the process requested to execute is a management object process. When the process corresponds to the management object process, a shadow memory area for the detection object memory area corresponding to the memory deallocation request is allocated to the memory address space of the kernel and the detection object memory area corresponding to the memory deallocation request is deallocated.

In the step of detecting a memory error, when three is a trial to access the virtual address of the shadow memory area for the detection object memory area corresponding to the memory deallocation request, error information having a second detailed error type flag (to be used after deallocation) is output.

The error detecting apparatus of a kernel memory may include at least one processor, a computer readable recording medium, and a communication bus.

The processor may be controlled to operate as the error detecting apparatus of a kernel memory. For example, the processor may execute one or more programs stored in the computer readable storage medium. One or more programs may include one or more computer executable command and the computer executable command may be configured to allow the error detecting apparatus of a kernel memory to perform the operations according to the exemplary embodiments when it is executed by the processor.

The computer readable storage medium is configured to store a computer executable command or program code, program data and/or other appropriate format of information. The program stored in the computer readable storage medium includes a set of commands which are executable by the processor. In one exemplary embodiment, the computer readable storage medium may be a memory (a volatile memory such as a random access memory, a non-volatile memory, or an appropriate combination thereof), one or more magnetic disk storage devices, optical disk storage devices, flash memory devices, and another format of storage mediums which is accessed by the error detecting apparatus of a kernel memory and stores desired information, or an appropriate combination thereof.

The communication bus connects various components of the error detecting apparatus of a kernel memory including the processor and the computer readable storage medium.

The error detecting apparatus of a kernel memory may include one or more input/output interfaces and one or more communication interfaces which provide an interface for one or more input/output devices. The input/output interface and the communication interface are connected to the communication bus. The input/output device may be connected to the other components of the error detecting apparatus of a kernel memory via the input/output interface.

The error detecting apparatus of a kernel memory may be implemented in a logic circuit by hardware, firm ware, software, or a combination thereof or may be implemented using a general purpose or special purpose computer. The apparatus may be implemented using hardwired device, field programmable gate array (FPGA) or application specific integrated circuit (ASIC). Further, the apparatus may be implemented by a system on chip (SoC) including one or more processors and a controller.

The error detecting apparatus of a kernel memory may be mounted in a computing device or a server provided with a hardware element as a software, a hardware, or a combination thereof. The computing device or server may refer to various devices including all or some of a communication device for communicating with various devices and wired/wireless communication networks such as a communication modem, a memory which stores data for executing programs, and a microprocessor which executes programs to perform operations and commands.

In FIGS. 8 to 10, the respective processes are sequentially performed, but this is merely illustrative and those skilled in the art may apply various modifications and changes by changing the order illustrated in FIGS. 8 to 10 or performing one or more processes in parallel or adding another process without departing from the essential gist of the exemplary embodiment of the present disclosure.

The operation according to the exemplary embodiment of the present disclosure may be implemented as a program instruction which may be executed by various computers to be recorded in a computer readable medium. The computer readable medium indicates an arbitrary medium which participates to provide a command to a processor for execution. The computer readable medium may include solely a program command, a data file, and a data structure or a combination thereof. For example, the computer readable medium may include a magnetic medium, an optical recording medium, and a memory. The computer program may be distributed on a networked computer system so that the computer readable code may be stored and executed in a distributed manner Functional programs, codes, and code segments for implementing the present embodiment may be easily inferred by programmers in the art to which this embodiment belongs.

The present embodiments are provided to explain the technical spirit of the present embodiment and the scope of the technical spirit of the present embodiment is not limited by these embodiments. The protection scope of the present embodiments should be interpreted based on the following appended claims and it should be appreciated that all technical spirits included within a range equivalent thereto are included in the protection scope of the present embodiments.

The invention claimed is:

1. An error detecting method of a kernel memory in real time, comprising:
    registering a management object process;
    allocating a memory area to a memory address space of the kernel with respect to the management object process;
    detecting a memory error for the memory area using an interrupt handler of the kernel; and
    deallocating the memory area,
    wherein the allocating of the memory area includes:
    allocating the memory area to a normal memory area of the memory address space of the kernel if a process requested to be executed does not correspond to the management object process;
    allocating the memory area to a detection object memory area of the memory address space of the kernel if the process requested to be executed corresponds to the management object process;
    setting a red zone in the detection object memory area;
    allocating a shadow memory area for the detection object memory area to the memory address space of the kernel; and
    setting a page access permission to a virtual address of the memory address space of the kernel to be inaccessible,
    wherein the detecting of the memory error includes:
    determining whether the virtual address that tried to be accessed is the detection object memory area or the normal memory area by means of a memory error test by an interrupt handler of the kernel, and
    wherein if the virtual address corresponds to the detection object memory area, the shadow memory area is tested to check the memory error, and if the test determines there is not an error, after changing the page access permission to the virtual address to be allowable, a single instruction is performed, and then the page access permission to the virtual address is reset to be inaccessible.

2. The error detecting method of a kernel memory in real time of claim 1, wherein a plurality of processes are simultaneously executed and the plurality of process share the memory address space of the kernel.

3. The error detecting method of a kernel memory in real time of claim 1,
    wherein in the detecting of the memory error, if the virtual address corresponds to the detection object memory area, the shadow memory area is tested to check the memory error and if the test determines that there is an error, error information having a detailed error type flag is output.

4. The error detecting method of a kernel memory in real time of claim 1,
    wherein when the virtual address corresponds to the normal memory area, the interrupt is processed by the kernel.

5. The error detecting method of a kernel memory in real time of claim 1,
    wherein in the deallocating, when a memory deallocation request for the process is received, if the process corresponds to the management object process, the shadow memory area for the detection object memory area corresponding to the memory deallocation request is allocated to the memory address space of the kernel and the detection object memory area corresponding to the memory deallocation request is deallocated.

6. The error detecting method of a kernel memory in real time of claim 5,
    wherein in the detecting of the memory error, if there is an access attempt to the virtual address of the shadow memory area for the detection object memory area corresponding to the memory deallocation request, error information having a detailed error type flag is output.

* * * * *